(12) United States Patent
Ling et al.

(10) Patent No.: US 10,511,054 B2
(45) Date of Patent: Dec. 17, 2019

(54) COMPOUNDS WITH MIXED ANIONS AS SOLID LI-ION CONDUCTORS

(71) Applicant: Toyota Motor Engineering & Manufacturing North America, Inc., Erlanger, KY (US)

(72) Inventors: Chen Ling, Ann Arbor, MI (US); Ying Zhang, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 15/805,672

(22) Filed: Nov. 7, 2017

(65) Prior Publication Data

US 2019/0140310 A1 May 9, 2019

(51) Int. Cl.
| | |
|---|---|
| *H01M 10/0562* | (2010.01) |
| *H01M 10/0525* | (2010.01) |
| *C01B 11/20* | (2006.01) |
| *C01B 21/083* | (2006.01) |

(52) U.S. Cl.
CPC ......... *H01M 10/0562* (2013.01); *C01B 11/20* (2013.01); *C01B 21/083* (2013.01); *H01M 10/0525* (2013.01); *C01P 2006/40* (2013.01); *H01M 2300/008* (2013.01); *H01M 2300/0071* (2013.01)

(58) Field of Classification Search
CPC ......... H01M 10/0525; H01M 10/0562; H01M 2300/0071; H01M 2300/008; C01B 11/20; C01B 21/083; C01P 2006/40
See application file for complete search history.

(56) References Cited

U.S. PATENT DOCUMENTS

| | | | |
|---|---|---|---|
| 9,356,315 B2 | 5/2016 | Ohtomo et al. | |
| 2012/0251871 A1 | 10/2012 | Suzuki et al. | |
| 2013/0071756 A1* | 3/2013 | Yada | H01B 1/06 |
| | | | 429/317 |
| 2013/0202971 A1* | 8/2013 | Zhao | H01M 10/0562 |
| | | | 429/323 |
| 2014/0272602 A1* | 9/2014 | Handa | H01M 10/0562 |
| | | | 429/322 |
| 2014/0356732 A1 | 12/2014 | Zidan et al. | |
| 2017/0018760 A1 | 1/2017 | Lupart et al. | |
| 2017/0155168 A1 | 6/2017 | Kanno et al. | |

FOREIGN PATENT DOCUMENTS

| | | | | |
|---|---|---|---|---|
| CN | 103926265 A | 7/2014 | | |
| CN | 106602138 A | 4/2017 | | |
| EP | 1186337 A2 * | 3/2002 | ............ | B01D 59/42 |

OTHER PUBLICATIONS

Zhu et al., Enhanced ionic conductivity with $Li_7O_2Br_3$ phase in LisOBr anti-perovskite solid electrolyte, Appl. Phys. Lett., 109, 101904 (2016) (Year: 2016).*

* cited by examiner

*Primary Examiner* — Adam A Arciero

(74) *Attorney, Agent, or Firm* — Oblon, McClelland, Maier & Neustadt, L.L.P.

(57) ABSTRACT

A solid-state lithium ion electrolyte is provided which contains a composite material having at least 94 mole % lithium ions as cation component and multiple anions in an anionic framework capable of conducting lithium ions. An activation energy for lithium ion migration in the solid state lithium ion electrolyte is 0.5 eV or less. Composites of specific formulae are provided. A lithium battery containing the composite lithium ion electrolyte is also provided.

3 Claims, 1 Drawing Sheet

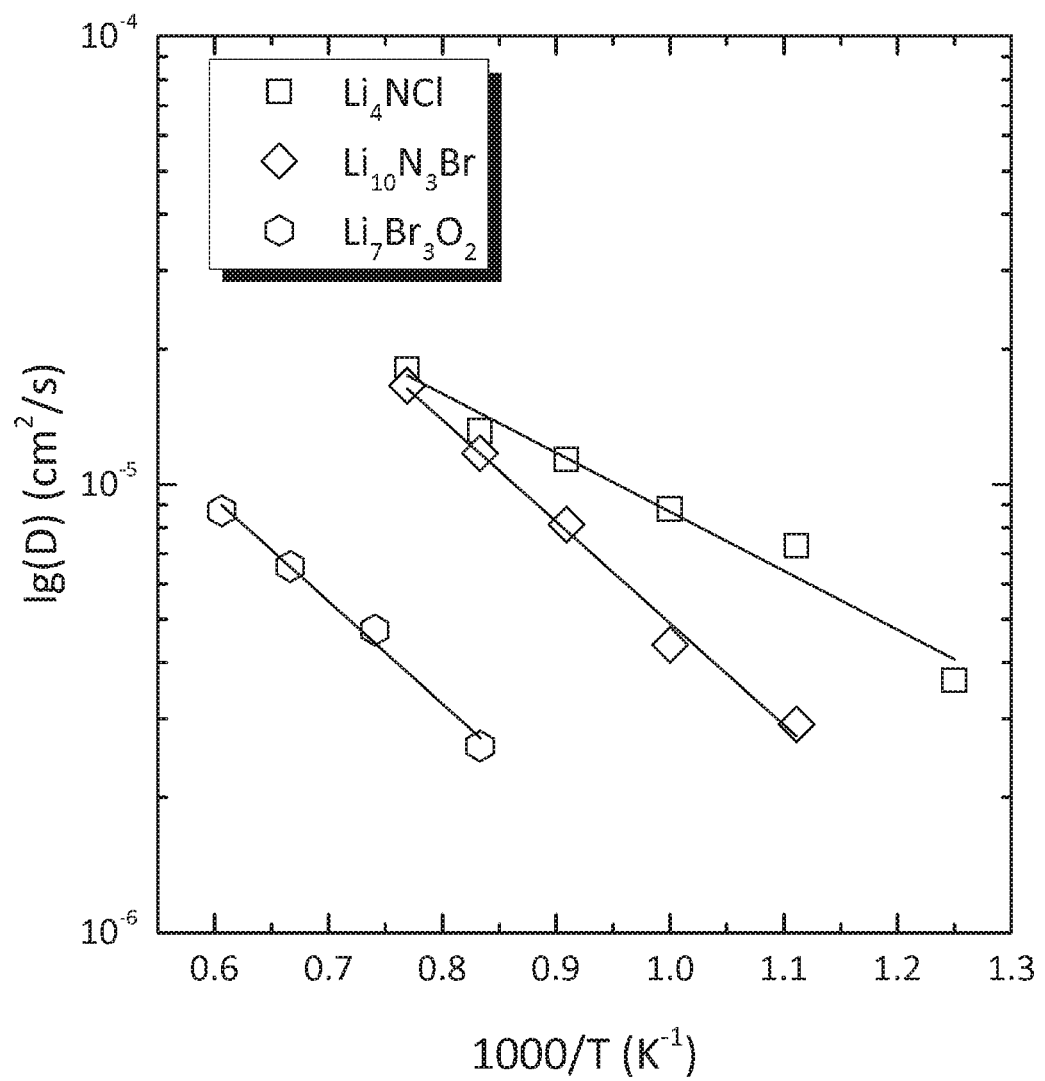

COMPOUNDS WITH MIXED ANIONS AS SOLID LI-ION CONDUCTORS

BACKGROUND

Li-ion batteries have traditionally dominated the market of portable electronic devices. However, conventional Li-ion batteries contain flammable organic solvents as components of the electrolyte and this flammability is the basis of a safety risk which is of concern and could limit or prevent the use of Li-ion batteries for application in large scale energy storage.

Replacing the flammable organic liquid electrolyte with a solid Li-conductive phase would alleviate this safety issue, and may provide additional advantages such as improved mechanical and thermal stability. A primary function of the solid Li-conductive phase, usually called solid Li-ion conductor or solid state electrolyte, is to conduct $Li^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent.

Therefore, there is much interest and effort focused on the discovery of new solid Li-ion conducting materials which would lead to an all solid state lithium battery. Studies in the past decades have focused mainly on ionically conducting oxides such as for example, LISICON ($Li_{14}ZnGe_4O_{16}$), NASICON ($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (for example, $Li_{2.88}PO_{3.73}N_{0.14}$) and sulfides, such as, for example, $Li_3PS_4$, $Li_7P_3S_{11}$ and LGPS ($Li_{10}GeP_2S_{12}$).

While recent developments have marked the conductivity of solid Li-ion conductor to the level of 1-10 mS/cm, which is comparable to that in liquid phase electrolyte, finding new Li-ion solid state conductors is of great interest.

An effective lithium ion solid-state conductor will have high $Li^+$ conductivity at room temperature and low activation energy of $Li^+$ migration in the conductor for use over a range of operation temperatures that might be encountered in the environment. Further, unlike many conventionally employed non-aqueous solvents, the solid-state conductor material should be stable to electrochemical degradation reactivity with the anode and cathode chemical composition. Environmentally stable composite materials having high $Li^+$ conductivity and low activation energy would be sought in order to facilitate manufacturing methods and structure of the battery.

The standard redox potential of Li/Li+ is −3.04 V, making lithium metal one of the strongest reducing agent available. Consequently, Li metal can reduce most known cationic species to a lower oxidation state. Because of this strong reducing capability when the lithium metal of an anode contacts a solid-state $Li^+$ conductor containing cation components different from lithium ion, the lithium reduces the cation specie to a lower oxidation state and deteriorates the solid-state conductor.

For example, the conductor of formula:

$$Li_3PS_4$$

contains $P^{5+}$ in the formula and is thus a secondary cation to the $Li^+$. When in contact with Li metal Li, reduction according to the following equation occurs (J. Mater. Chem. A, 2016, 4, 3253-3266).

$$Li_3PS_4+5Li \rightarrow P+4Li_2S$$

$$P+3Li \rightarrow Li_3P$$

Similarly, $Li_{10}GeP_2S_{12}$ has also been reported to undergo degradation when in contact with lithium metal according to the following equations (J. Mater. Chem. A, 2016, 4, 3253-3266):

$$Li_{10}GeP_2S_{12}+10Li \rightarrow 2P+8Li_2S+Li_4GeS_4$$

$$P+3Li \rightarrow Li_3P$$

$$4Li_4GeS_4+31Li \rightarrow 16Li_2S+Li_{15}Ge_4$$

$Li_{10}GeP_2S_{12}$ contains $Ge^{4+}$ and $P^{5+}$ and each is reduced as indicated.

In another example, $Li_7La_3Zr_2O_{12}$, which contains secondary cations $La^{3+}$ and $Zr^{4+}$ undergoes chemical degradation when in contact with lithium metal according to the following chemistry (J. Mater. Chem. A, 2016, 4, 3253-3266):

$$6Li_7La_3Zr_2O_{12}+40Li \rightarrow 4Zr_3O+41Li_2O+9La_2O_3$$

$$Zr_3O+2Li \rightarrow Li_2O+3Zr$$

$$La_2O_3+6Li \rightarrow 2La+3Li_2O$$

Thus, many current conventionally known solid Li-ion conductors suffer a stability issue when in contact with a Li metal anode.

The inventors of this application have been studying lithium composite compounds which may serve for future use of solid-state Li+ conductors and previous results of this study are disclosed in U.S. application Ser. No. 15/626,696, filed Jun. 19, 2017. However, composites of highest efficiency, highest stability, low cost and ease of handling and manufacture continue to be sought.

Accordingly, an object of this application is to identify a range of further materials having high Li ion conductivity while being poor electron conductors which are suitable as a solid state electrolyte for a lithium ion battery.

A further object of this application is to provide a solid state lithium ion battery containing a solid state Li ion electrolyte membrane.

SUMMARY OF THE EMBODIMENTS

These and other objects are provided by the embodiments of the present application, the first embodiment of which includes a solid-state lithium ion electrolyte, comprising: a composite material having at least 94 mole % lithium ions as cation component and multiple anions; in an anionic framework capable of conducting lithium ions; wherein an activation energy for lithium ion migration in the solid state lithium ion electrolyte is 0.5 eV or less.

In an aspect of the first embodiment a lithium ion ($Li^+$) conductivity of the solid state lithium ion electrolyte is at least $10^{-6}$ S/cm at room temperature.

One aspect of the first embodiment includes a solid-state lithium ion electrolyte of formula (I):

$$Li_{7-nx}M_xBr_3O_2 \quad (I)$$

wherein

M is cation of n+ charge, x is a number from 0 to 0.7, and
n is 2 or 3.

A second aspect of the first embodiment includes a solid state lithium ion electrolyte of formula (II):

$$Li_{10-ny}M_yN_3Br \qquad (II)$$

wherein
M is cation of n+ charge,
y is a number from 0 to 1.0, and
n is 2 or 3.

A third aspect of the first embodiment includes a solid state lithium ion electrolyte of formula (III):

$$Li_{5-nz}M_zNCl_2 \qquad (III)$$

wherein M is cation of n+ charge,
z is a number from 0 to 0.5, and
n is 2 or 3.

A fourth aspect of the first embodiment includes a solid state lithium ion electrolyte of formula (IV):

$$Li_{4-nw}M_wNCl \qquad (IV)$$

wherein M is cation of n+ charge,
w is a number from 0 to 0.4, and
n is 2 or 3.

A fifth aspect of the first embodiment includes a solid state lithium ion electrolyte of formula (V):

$$Li_{6-nt}M_tNBr_3 \qquad (V)$$

wherein M is cation of n+ charge,
t is a number from 0 to 0.6, and
n is 2 or 3.

A sixth aspect of the first embodiment includes a solid state lithium ion electrolyte of formula (VI):

$$Li_{6-ns}M_sNI_3 \qquad (VI)$$

wherein M is cation of n+ charge,
x is a number from 0 to 0.6, and
n is 2 or 3.

In a second embodiment a solid state lithium battery is included. The solid state lithium battery comprises: an anode; a cathode; and a solid state lithium ion electrolyte located between the anode and the cathode; wherein the solid state lithium ion electrolyte comprises a composite material according to any of the aspects of the first embodiment.

The forgoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

BRIEF DESCRIPTION OF THE DRAWINGS

The FIGURE shows diffusivity of Li obtained from ab initio molecular dynamics simulation for selected composites of aspects of the first embodiment.

DESCRIPTION OF THE PREFERRED EMBODIMENTS

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently.

Structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy.

The inventors are investigating new lithium composite compounds in order to identify materials having the properties described above which may serve as solid-state electrolytes in solid state lithium batteries. In the course of this ongoing study and effort the inventors have developed and implemented a methodology to identify composite materials which have chemical and structural properties which have been determined by the inventors as indicators of lithium ion conductance suitable to be a solid state electrolyte for a lithium-ion battery.

As described above, the inventors have recognized that a root cause of the instability of a lithium composite compound against a Li metal anode is the reduction of non-lithium cations (secondary cations) in the compounds. Accordingly in the developed methodology, (a) only composite lithium compounds having no secondary cation(s) may be considered. In this regard, materials containing only $Li^+$ as cation specie may be included. In theory, any anion which meets the other criteria requirements described herein may be present in the composite structures. One of knowledge and skill in lithium composite chemistry will be able to identify anions suitable for study according to the method disclosed in this application.

If an anion containing at least one of $N^{3-}$, $O^{2-}$, $S^{2-}$, $F^-$, $Cl^-$, $Br^-$ and $I^-$ is selected as a basis for evaluation, seven compounds of formulae $Li_3N$, $Li_2O$, $Li_2S$, $LiF$, $LiCl$, $LiBr$ and $LiI$ may be considered.

A criterion of this methodology requires that to qualify as solid state electrolyte in practical application, the material must exhibit desirable Li-ion conductivity, usually no less than $10^{-6}$ S/cm at room temperature. Thus, ab initio molecular dynamics simulation studies are were applied to calculate the diffusivity of Li in the lattice structures of these seven materials. In order to accelerate the simulation, the calculation was performed at high temperatures and the effect of excess Li or Li vacancy was considered. In order to create excess Li or Li vacancy, aliovalent replacement of cation or anions was evaluated. Thus, Li vacancy was created by, for example, partially substituting $N^{3-}$ anion for the anions of the material. Li vacancies may also be created by partially replacing $Li^+$ cation with higher valent cations such as $Mg^{+2}$. The diffusivity at 300 K was determined according to equation (I)

$$D=D_0 \exp(-E_a/k_bT) \qquad \text{equation (I)}$$

where $D_0$, $E_a$ and $k_b$ are the pre-exponential factor, activation energy and Boltzmann constant, respectively. The conductivity is related with the calculated diffusivity according to equation (II):

$$\sigma=D_{300}\rho e^2/k_bT \qquad \text{equation (II)}$$

where $\rho$ is the volumetric density of Li ion and e is the unit charge.

The only compound with room temperature Li-ion conductivity higher than $10^{-6}$ S/cm was determined to be $Li_3N$, while the remaining compounds have conductivity lower than $10^{-10}$ S/cm.

Accordingly, the inventors adapted the methodology to consider (b) compounds with two or more types of anions, defined as mixed anions, in the formula. Combining condition (a) and (b), the methodology limits the Li-ion conductors according to the first embodiment to compounds (a) not having a secondary cation and (b) to compounds having at least two different (mixed) anions.

The anionic lattice of Li-ion conductors has been shown to match certain lattice types (see Nature Materials, 14, 2015, 2016). Therefore, in (c) the anionic lattice of the potential $Li^+$ ion conductor is compared to the anionic lattice of $Li^+$ ion conductor known to have high conductivity.

Thus, lithium compounds (a) having no secondary cation and (b) having mixed anions of $N^{3-}$, $O^{2-}$, $S^{2-}$, $F^-$, $Cl^-$, $Br^-$ and $I^-$ were compared to Li-containing compounds reported in the inorganic crystal structure database (FIZ Karlsruhe ICSD—https://icsd.fiz-karlsruhe.de) and evaluated in comparison according to an anionic lattice matching method developed by the inventors for this purpose and described in copending U.S. application Ser. No. 15/597,651, filed May 17, 2017, to match the lattice of these compounds to known Li-ion conductors.

According to the anionic lattice matching method described in copending U.S. application Ser. No. 15/597,651, an atomic coordinate set for the compound lattice structure may be converted to a coordinate set for only the anion lattice. The anions of the lattice are substituted with the anion of the comparison material and the obtained unit cell rescaled. The x-ray diffraction data for modified anion-only lattice may be simulated and an n×2 matrix generated from the simulated diffraction data. Quantitative structural similarity values can be derived from the n×2 matrices.

The purpose of anionic lattice matching is to further identify compounds with greatest potential to exhibit high $Li^+$ conductivity. From this work, the compounds listed in Table 1 were determined to be potentially suitable as a solid-state $Li^+$ conductor. Among the compounds identified, $Li_3OBr$ was reported as a solid Li conductor (Zhao et al., J Am. Chem. Soc., 2012, 134, 15042).

TABLE 1

Compounds meeting requirement (a) and (b) with the lattice matching to known solid Li-ion conductors.

| | Compound | | | | |
|---|---|---|---|---|---|
| | $Li_7Br_3O_2$ | $Li_{10}N_3Br$ | $Li_5NCl_2$ | $Li_4NCl$ | $Li_6NBr_3$ | $Li_6NI_3$ |
| Anions | $Br^-, O^{2-}$ | $Br^-, N^{3-}$ | $Cl^-, N^{3-}$ | $Cl^-, N^{3-}$ | $Br^-, N^{3-}$ | $I^-, N^{3-}$ |
| Lattice matched to | $LiZnPS_4$ | $Li_{10}GeP_2S_{12}$ | $Li_6PS_5Br$ | $Li_3N$ | $Li_3OBr$ | $Li_3OBr$ |

Ab initio molecular dynamics (AIMD) simulation was then applied to predict the conductivity of $Li_4NCl$, $Li_7Br_3O_2$ and $Li_{10}N_3Br$. The simulation was carried out with a small amount of Mg replacing Li to create the mobile Li vacancy. To accelerate the simulation, the calculation was performed at high temperatures. The FIGURE shows the calculated diffusivity for each of the three studied compositions. In the temperature range of 800-1650 K, the diffusivity for all compounds are in the order of $10^{-4}$ to $10^{-6}$ cm²/s, and shows good Arrhenius dependence on temperature.

Table 2 lists the activation energy barriers and the conductivities at 300 K for these compounds. All three compounds have the conductivities above $10^{-6}$ S/cm, meeting the requirement of solid Li-ion conductor. More importantly, these compounds are stable when contacted with metal Li, indicating they can be used directly as solid state electrolyte with metal Li anode.

TABLE 2

Activation energy and room temperature conductivity of $Li_4NCl$, $Li_{10}N_3Br$ and $Li_7Br_3O_2$ from AIMD simulations.

| Compound | Composition in AIMD simulation | $E_a$ (eV) | σ (S/cm) |
|---|---|---|---|
| $Li_4NCl$ | $Li_{3.56}Mg_{0.22}NCl$ | 0.26 | $2.1 \times 10^{-3}$ |
| $Li_{10}N_3Br$ | $Li_{9.33}Mg_{0.33}N_3Br$ | 0.45 | $7.9 \times 10^{-6}$ |
| $Li_7Br_3O_2$ | $Li_6Mg_{0.5}Br_3O_2$ | 0.43 | $2.6 \times 10^{-6}$ |

As described the compounds are doped by replacing a maximum of 10 mole % of a total cation content of lithium with a dopant cation having a +2 or +3 charge in order to create vacancies for lithium mobility, while maintaining charge neutrality.

Accordingly, in the first embodiment, the present application provides a solid-state lithium ion electrolyte, comprising: comprising: a composite material having at least 94 mole % lithium ions as cation component and multiple anions; in an anionic framework capable of conducting lithium ions; wherein the composite material is in the form of an anionic framework capable of conducting lithium ions, and an activation energy for lithium ion migration in the solid state lithium ion electrolyte is 0.5 eV or less.

In an aspect of the first embodiment a lithium ion ($Li^+$) conductivity of the solid state lithium ion electrolyte is at least $10^{-6}$ S/cm at room temperature.

One aspect of the first embodiment includes a solid-state lithium ion electrolyte of formula (I):

$$Li_{7-nx}M_xBr_3O_2 \quad (I)$$

wherein
M is cation of n+ charge,
x is a number from 0 to 0.7, and
n is 2 or 3.

A second aspect of the first embodiment includes a solid state lithium ion electrolyte of formula (II):

$$Li_{10-ny}M_yN_3Br \quad (II)$$

wherein
M is cation of n+ charge,
y is a number from 0 to 1.0, and
n is 2 or 3.

A third aspect of the first embodiment includes a solid state lithium ion electrolyte of formula (III):

$$Li_{5-nz}M_zNCl_2 \quad (III)$$

wherein M is cation of n+ charge,
z is a number from 0 to 0.5, and
n is 2 or 3.

A fourth aspect of the first embodiment includes a solid state lithium ion electrolyte of formula (IV):

$$Li_{4-nw}M_wNCl \quad (IV)$$

wherein M is cation of n+ charge,
w is a number from 0 to 0.4, and
n is 2 or 3.

A fifth aspect of the first embodiment includes a solid state lithium ion electrolyte of formula (V):

$$Li_{6-nt}M_tNBr_3 \quad (V)$$

wherein M is cation of n+ charge,
t is a number from 0 to 0.6, and
n is 2 or 3.

A sixth aspect of the first embodiment includes a solid state lithium ion electrolyte of formula (VI):

$$Li_{6-ns}M_sNI_3 \quad (VI)$$

wherein M is cation of n+ charge,
s is a number from 0 to 0.6, and
n is 2 or 3.

Further to each of the six aspects a lithium ion (Li+) conductivity of the solid state lithium ion electrolyte may be at least $10^{-6}$ S/cm at room temperature.

Synthesis of the composite materials of the first embodiment may be achieved by solid state reaction between stoichiometric amounts of selected precursor materials.

For example, Li$_4$NCl can be synthesized from Li$_3$N and LiCl at 450° C. (Journal of Solid State Chemistry, 128, 1997, 241). Li$_{10}$N$_3$Br can be prepared from Li$_3$N and LiBr at 500° C. (Zeitschrift für Naturforschung B, 50, 1995, 1061). Li$_5$NCl$_2$ can be prepared from Li$_3$N and LiCl in a solid state reaction at 450° C. (Journal of Solid State Chemistry 130, 1997, 90). Li$_6$NBr$_3$ can be prepared from Li$_3$N and LiBr at 430° C. (Journal of Alloys and Compounds, 645, 2015, S174). Li$_6$NI$_3$ can be prepared from Li$_3$N and LiI at 490° C. (Z. Naturforsch. 51b, 199652 5)

In further embodiments, the present application includes solid state lithium ion batteries containing the solid-state electrolytes described above. Solid-state batteries of these embodiments including metal-metal solid-state batteries may have higher charge/discharge rate capability and higher power density than classical batteries and may have the potential to provide high power and energy density.

Thus in further embodiments, solid-state batteries comprising: an anode; a cathode; and a solid state lithium ion electrolyte according to the embodiments described above, located between the anode and the cathode are provided.

The anode may be any anode structure conventionally employed in a lithium ion battery. Generally such materials are capable of insertion and extraction of Li+ ions. Example anode active materials may include graphite, hard carbon, lithium titanate (LTO), a tin/cobalt alloy and silicon/carbon composites. In one aspect the anode may comprise a current collector and a coating of a lithium ion active material on the current collector. Standard current collector materials include but are not limited to aluminum, copper, nickel, stainless steel, carbon, carbon paper and carbon cloth. In an aspect advantageously arranged with the solid-state lithium ion conductive materials described in the first and second embodiments, the anode may be lithium metal or a lithium metal alloy, optionally coated on a current collector. In one aspect, the anode may be a sheet of lithium metal serving both as active material and current collector.

The cathode structure may be any conventionally employed in lithium ion batteries, including but not limited to composite lithium metal oxides such as, for example, lithium cobalt oxide (LiCoO$_2$), lithium manganese oxide (LiMn$_2$O$_4$), lithium iron phosphate (LiFePO$_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

The invention claimed is:

1. A solid-state lithium ion electrolyte, comprising:
a composite material of formula (I);
in an anionic framework capable of conducting lithium ions:

$$Li_{7-nx}M_xBr_3O_2 \quad (I)$$

wherein
M is a +2 or +3 cation,
0<x≤0.7,
n is 2 or 3,
a mole % content of M is greater than 0 and less than or equal to 10 mole % based on total moles of lithium and M, and
an activation energy for lithium ion migration in the solid state lithium ion electrolyte is 0.5 eV or less.

2. The solid-state lithium electrolyte according to claim 1 wherein a lithium ion (Li+) conductivity of the solid state lithium ion electrolyte is at least $10^{-6}$ S/cm at room temperature.

3. A solid state lithium battery, comprising:
an anode;
a cathode; and
a solid state lithium ion electrolyte located between the anode and the cathode;
wherein
the solid state lithium ion electrolyte comprises the composite material of claim 1.

* * * * *